Sept. 7, 1948. W. A. WILLIAMS 2,448,645
HARDNESS TESTER
Filed July 30, 1945
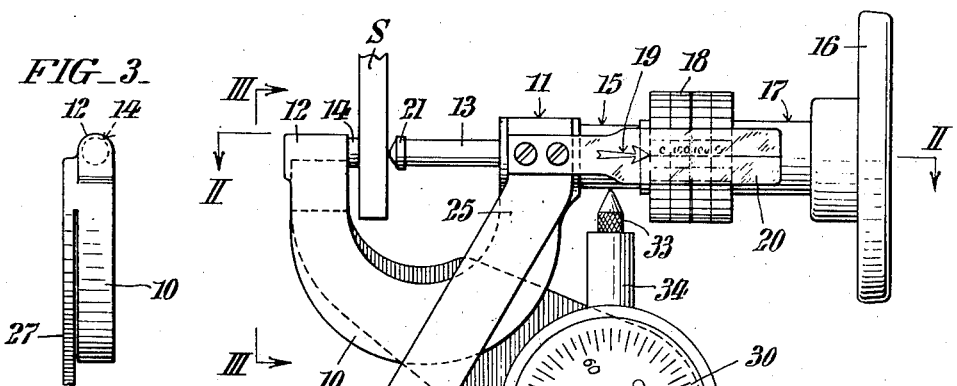
FIG_1
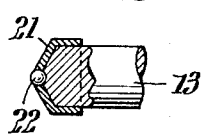
FIG_3
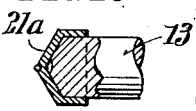
FIG_7
FIG_8
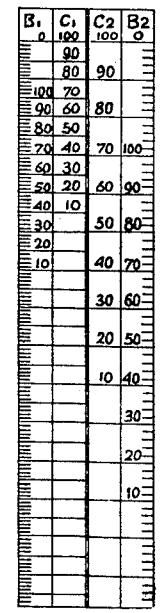
FIG_4
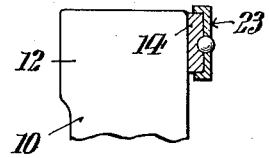
FIG_5
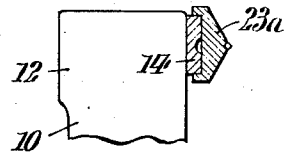
FIG_6
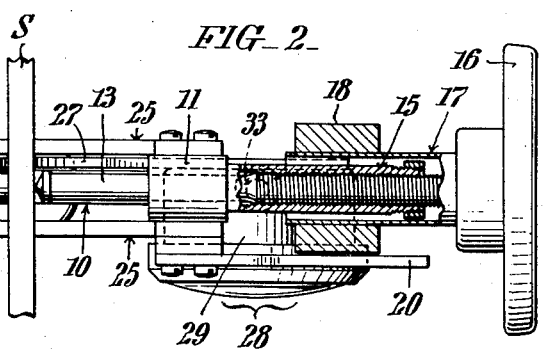
FIG_2
INVENTOR:
William A. Williams,
BY Paul & Paul
ATTORNEYS.

Patented Sept. 7, 1948

2,448,645

UNITED STATES PATENT OFFICE 2,448,645

HARDNESS TESTER

William A. Williams, Philadelphia, Pa., assignor to The American Pulley Company, Philadelphia, Pa., a corporation of Pennsylvania Application July 30, 1945, Serial No. 607,681

6 Claims. (Cl. 73—81)

1

This invention relates to hardness testers, that is to say, to devices useful in determining the hardness of different materials in terms of their resistivity to penetration.

The making of such tests heretofore entailed the use of huge, cumbersome and expensive machines in which the test pieces had to be mounted. Thus the testing of large and heavy objects or specimens was not only laborious and painstaking, but time consuming as well.

The chief aim of my invention is to overcome the drawbacks above pointed out, which desideratum I realize in practice as hereinafter more fully explained, through provision of a hardness tester in the form of a hand instrument which is relatively small, compact and simple and inexpensive in construction; which is light in weight so that it can be readily carried about and applied to the specimens to be tested; and from which the degree of hardness of the specimen under test can be directly ascertained without necessitating resort to supplementary instruments or charts.

Other objects and attendant advantages will appear from the following detailed description of the attached drawings, wherein Fig. 1 is a view in side elevation of a hardness tester conveniently embodying my invention.

Fig. 2 is a view showing the hardness tester partly in top plan and partly in horizontal section taken as indicated by the angled arrows II—II in Fig. 1.

Fig. 3 is a fragmentary detail view in end elevation looking as indicated by the angled arrows III—III in Fig. 1.

Fig. 4 shows the development of a hardness scale incorporated in the tester.

Figs. 5, 6 and 7, 8 are fragmentary detail views respectively showing interchangeable penetration elements for use in making different tests with the instrument.

As exemplified in Figs. 1-3 of these drawings, my improved hardness tester is characterized by having a relatively small yoke-like arcuate frame 10 formed from hardened material having a definite degree of flexibility, preferably tempered tool steel, with bosses 11 and 12 at its opposite extremities. The boss 11 is apertured to act as a bearing for a screw spindle 13; while the boss 12 supports an anvil head 14 in axial alignment with said spindle. From Fig. 2 it will be observed that the threads of the spindle 13 (of which there are in the present instance forty to the inch) are engaged in the tapped bore of an outward diametrically-reduced apertured extension 15 of the

2 boss 11, and that said spindle at its outer end has a hand wheel 16 with an axial tubular hub prolongation 17 which surrounds the end of the aforementioned extension of said boss. The hand wheel 16 is preferably made of material such as a plastic so as not to add to the weight of the instrument or to affect its accuracy. Rotatably adjustable about the hub prolongation 17 of the wheel 16 is a collar 18 whereof the cylindric surface is graduated to serve in a manner later on explained as a direct reading hardness-indicating scale by coordination with an arrow 19 inscribed upon a fixed over-reaching transparent projection 20 on the boss 11 of the yoke 10. It will be obvious to one skilled in the art that the elements 18 and 20 can be rearranged without changing their relative and cooperative function; for example, by a reversal of parts in which the element 20 is rotatably mounted on the hub prolongation 17 and the collar 18 is mounted on the boss 11. At its inner end, the spindle 13 is fitted with a removable taper-ended cap such as shown in detail at 21 in Fig. 7 with a penetrator ball 22 retentively lodged in its tip. The ball penetrator spindle cap 21 is intended to be used ordinarily with the plain anvil 14 of Figs. 1 and 2 in testing flat specimens of relatively soft metals, but in testing curved objects such as rings, tubing, cup-shaped stampings, etc., it is more advantageous to employ in addition a ball penetrator cap such as shown in detail at 23 in Fig. 5 on the anvil 14. For testing of harder materials, on the other hand, I provide, in accordance with my invention, individual interchangeable diamond point penetrator caps such as shown respectively at 21a and 23a in Figs. 6 and 8 for the spindle 13 and the anvil 14.

Secured to opposite sides of the boss 11 of the yoke 10 as by welding are parallel handle bars 25 which extend downwardly and forwardly at an angle and to these is fastened a grasp 26 whereby the instrument may be held in the left hand while the tests are being made, so that the right hand may be employed to turn the spindle 13 and to make other adjustments as will also be explained later.

Welded or otherwise permanently secured to the anvil boss 12 at one side is a lever arm 27 which is fashioned from comparatively stout and rigid hardened sheet steel to the configuration shown. This lever arm 27 extends downwardly and rearwardly through the interval between the handle bars 25 substantially at a perpendicular to the latter, and, as shown in Fig. 3, is free of contact with the yoke 10 except at the region of its connection to the boss 12, as well as free of contact with said handle bars. On the outer end of the lever arm 27 is mounted a load indicator 28 which may be of any approved commercial type having an annular casing 29 and a dial 30. The pointer or hand 32 of the indicator 28 is actuated, through gear connections (not illustrated), by a spring biased plunger 33 which is confined to endwise movement in tubular guide projections 34 and 35 on the casing 29, with its tapered end bearing laterally against the extension 15 of the boss 11 at a point adjacent the outer end of the latter.

The hardness scale on the collar of the spindle has four subdivisions as shown in Fig. 4 respectively designated B', C', C² and B² with graduations along opposite edges common respectively to the subdivisions B', C', and C², B² but differently numbered. The B' subdivision is intended to give the readings when a ball penetrator is used on the spindle only; the B² subdivision when ball penetrators are used on both the spindle and the anvil; the C' subdivision when a diamond point penetrator is used on the spindle only; and the C² scale when diamond point penetrators are used on both the spindle and the anvil. The hardness scale is preferably (although not necessarily) calibrated to indicate the depth of penetration in units of .0008 inch—the standard which is generally employed in the art. Thus with the spindle 13 having forty threads per inch, with a pitch of .025 inch the collar 18 at the B' and C' sections of the scale is stepped off in degrees spaced by a distance equal to one-one hundred and fifty-sixth $$\left(\frac{.025}{.0008} \div 2\right)$$

of the circumference of said collar, each subdivision thus representing two increments of hardness; while at the B² and C² sections of the scale, there are just half as many spaces each representing four increments of hardness for double penetration readings. The scale sections B', C' and B², C² are moreover respectively numbered at suitable intervals to facilitate reading.

The load indicator 28, on the other hand, is calibrated with numerals respectively designating the zero point and the 100 and 150 kg. points, as well as with the letter "I" designating the ten kg. point, these values being determined from actual dead weights used in calibrating.

In making a test for example on a flat specimen S (Fig. 1) of relatively soft metal, the instrument is clamped over the specimen as shown and the spindle 13 rotated until the hand 32 of the load indicator 28 points to the graduation I, with incidental flexure of the yoke 10, whereby an initial load of 10 kg. is applied by the ball 21 on the spindle for surface penetration of the test piece. The hardness indicator collar 18 is then set at 0 and the spindle 13 turned tighter with further flexure of the yoke 10 until the load indicator 28 reads, say 100. Finally the spindle 13 is backed off until the load indicator 28 again stands at I when the reading of the subdivision B' of the hardness scale will indicate the degree of hardness of the specimen.

In instances where it is desirable or advantageous to employ the ball cap 23 of Fig. 5 on the anvil 14 together with the ball penetrator 21 on the spindle 13, the test is made by following the same procedure as before but with use of the section B² of the hardness scale.

As already stated hereinbefore, for tests of harder materials with the diamond point penetrator 21a of Fig. 8 on the spindle 13 in conjunction with the bare anvil 14, the C' section of the hardness scale gives the hardness reading; while when the diamond point penetrator 23a of Fig. 6 is used on the said anvil with the diamond point penetrator on said spindle, reference is had to the C² section of the hardness scale for the hardness reading. In both of the latter instances the manipulation of the instrument is likewise as before.

Since the load in all cases is applied through flexure of the yoke 10, it is possible to secure an accurate measure of the depth of penetration on flat solid specimens by reading the hardness scale when the load indicator is on the 100 or 150 kilogram mark without returning the load indicator 28 to I, but this requires a new zero mark on the hardness scale to compensate for deflection of the yoke 10 between I and 100 or 150 on the load indicator 28, and a different zero for the 100 kg. load from that for the 150 kg. load as shown in Fig. 4.

Having thus described my invention, I claim:

1. A hardness tester comprising a flexible yoke with an anvil on one of its extremities, and a screw spindle with a penetrating point rotatably adjustable in the other extremity for engaging opposite faces of the specimen to be tested, said spindle having circumferential graduations for direct reading of the degree of penetration by coordination with a marker on the yoke; a lever arm with one end thereof rigidly secured to the end of the spindle-carrying extremity of the yoke and otherwise free; an indicator on the lever arm influenced by flexure of the yoke as the load is applied to the test piece by the screw spindle, said indicator having a point contact plunger in yielding lateral engagement with the spindle-carrying extremity of the yoke, and a pointer actuated by the plunger and coordinative with a scale graduated in terms of load units.

2. A hardness tester according to claim 1 in the form of a hand instrument for application to the specimen and having a supporting handle attached to the yoke.

3. A hardness tester comprising a flexible yoke with an anvil on one of its extremities and a penetrator screw spindle threadedly engaged in the other extremity for engaging opposite faces of the specimen to be tested; a direct reading load indicator mounted on said yoke and actuated by flexure of the yoke as the spindle is turned in applying pressure to the specimen; a direct reading hardness scale means mounted on the spindle with capacity for rotatable adjustment, and a reference means mounted on said yoke in cooperative relation with said hardness scale means whereby said hardness scale means may be set to a predetermined position after application of a predetermined initial load on the specimen.

4. A hardness tester according to claim 3, wherein the yoke extremity opposite that carrying the penetrator means is provided with an additional penetrator means.

5. A hardness tester comprising a flexible yoke between the extremities of which the specimen to be tested is inserted; a penetrator means adjustable in one of the yoke extremities for penetrating the specimen while buttressed by the other extremity; a load indicator supported from the other extremity of the yoke and actuated by flexure of the yoke as the penetrator means is adjusted in applying pressure to the specimen; an indicator associated with the penetrator means for registering the degree of penetration; and a supporting shank handle having a connection with the yoke at the first mentioned extremity only.

6. A hardness tester comprising a flexible yoke between the extremities of which the specimen to be tested is inserted; penetrator means adjustable in one of the yoke extremities for penetrating the specimen while buttressed by the other extremity; an arm connected to the yoke at said other extremity; an indicator mounted on the outer end of the arm; an operating connection between the indicator and the first mentioned extremity; and a supporting shank handle having connection with the yoke at the first mentioned extremity only.

WILLIAM A. WILLIAMS.

REFERENCES CITED

The following references are of record in the file of this patent:

UNITED STATES PATENTS

| Number | Name | Date |
| --- | --- | --- |
| 1,120,461 | Evans | Dec. 8, 1914 |
| 1,771,858 | Mohr | July 29, 1930 |
| 1,973,333 | Graemer | Sept. 11, 1934 |

FOREIGN PATENTS

| Number | Country | Date |
| --- | --- | --- |
| 16,588 | Great Britain | 1909 |